(12) United States Patent
Zhu

(10) Patent No.: US 11,679,757 B2
(45) Date of Patent: Jun. 20, 2023

(54) CONTROL ASSISTANT SYSTEM TO ALIGN DRIVING AND RIDING EXPERIENCE BETWEEN GASOLINE AND ELECTRIC VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 297 days.

(21) Appl. No.: 16/730,379

(22) Filed: Dec. 30, 2019

(65) Prior Publication Data
US 2021/0197793 A1  Jul. 1, 2021

(51) Int. Cl.
| | |
|---|---|
| B60L 15/20 | (2006.01) |
| B60W 20/19 | (2016.01) |
| B60W 10/06 | (2006.01) |
| B60W 10/08 | (2006.01) |

(52) U.S. Cl.
CPC ............ *B60W 20/19* (2016.01); *B60L 15/20* (2013.01); *B60W 10/06* (2013.01); *B60W 10/08* (2013.01); *B60W 2540/10* (2013.01); *B60W 2710/0677* (2013.01); *B60W 2710/086* (2013.01)

(58) Field of Classification Search
None
See application file for complete search history.

(56) References Cited

U.S. PATENT DOCUMENTS

| | | | | |
|---|---|---|---|---|
| 6,321,144 | B1 * | 11/2001 | Crombez | B60L 15/2009 701/22 |
| 2012/0323428 | A1 * | 12/2012 | Bissontz | B60W 30/1886 701/22 |
| 2021/0053487 | A1 * | 2/2021 | Vangelov | B60W 40/107 |

* cited by examiner

*Primary Examiner* — James M McPherson
(74) *Attorney, Agent, or Firm* — Womble Bond Dickinson (US) LLP

(57) ABSTRACT

A method, apparatus, and system for modifying acceleration characteristics of an electric vehicle is disclosed. A persistent input throttle command signal that starts at a first time instant is received at a vehicle control system of a first vehicle that is a first type vehicle. A transformed throttle command signal is generated based on the persistent input throttle signal and a present time at the vehicle control system. An engine operation of the first vehicle is controlled based on the transformed throttle command signal at the vehicle control system. Controlling the engine operation of the first vehicle based on the transformed throttle command signal causes the engine power output of the first vehicle to be associated with a second acceleration performance curve that is associated with a second type vehicle.

20 Claims, 8 Drawing Sheets

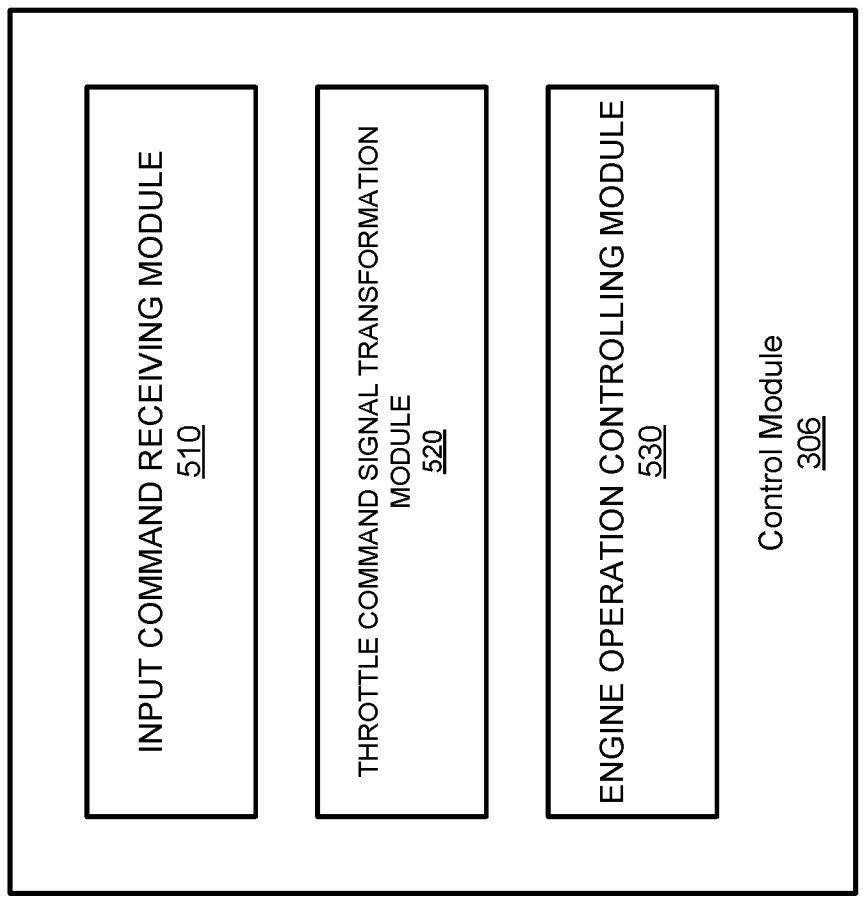

CONTROL ASSISTANT SYSTEM TO ALIGN DRIVING AND RIDING EXPERIENCE BETWEEN GASOLINE AND ELECTRIC VEHICLES

TECHNICAL FIELD

Embodiments of the present disclosure relate generally to operating vehicles. More particularly, embodiments of the disclosure relate to a control system of an electric vehicle.

BACKGROUND

Electric vehicles are associated with better acceleration characteristics than conventional fossil fuel (e.g., gasoline, diesel, etc.) vehicles. In other words, it takes a shorter period of time to reach a certain speed with an electric vehicle. However, this higher performance is not necessary in most cases, and may in fact cause driver and passenger discomfort.

BRIEF DESCRIPTION OF THE DRAWINGS

Embodiments of the disclosure are illustrated by way of example and not limitation in the figures of the accompanying drawings in which like references indicate similar elements.

FIG. 5 is a block diagram illustrating various modules usable with embodiments of the disclosure.

DETAILED DESCRIPTION

Figure 1:
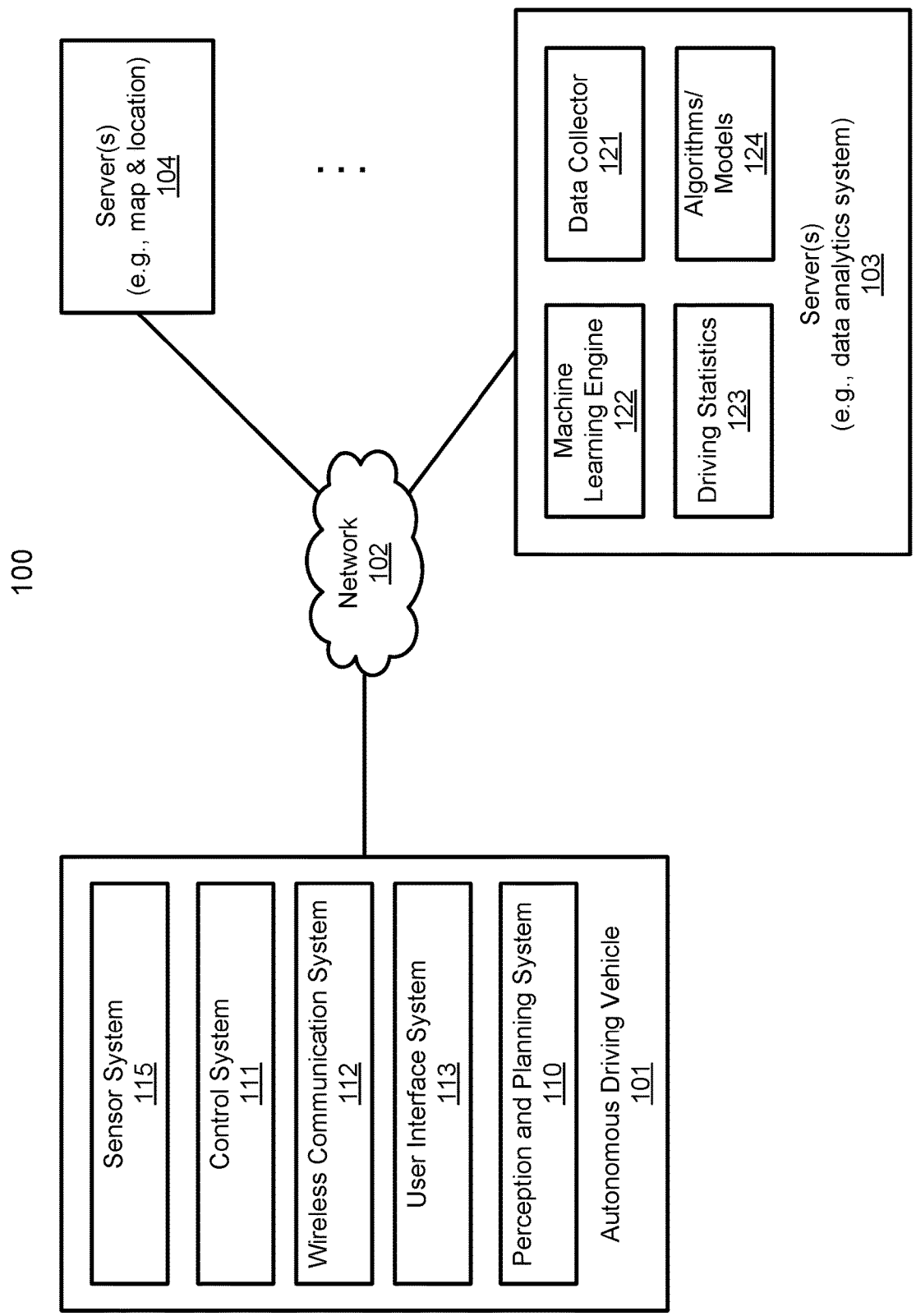
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Electric vehicles are associated with better acceleration characteristics than conventional fossil fuel (e.g., gasoline, diesel, etc.) vehicles. In other words, it takes a shorter period of time to reach a certain speed with an electric vehicle. However, this higher performance is not necessary in most cases, and may in fact cause driver and passenger discomfort.

According to one embodiment, a persistent input throttle command signal is received that starts at a first time instant at a vehicle control system of the ADV that is a first type vehicle. A timing factor is determined based on a present time relative to the first time instant using a first acceleration performance curve representing a power transient response of the first type vehicle and a second acceleration performance curve representing a power transient response of a second type vehicle, in response to a throttle command. A transformed throttle command signal is generated based on the persistent input throttle signal in view of the timing factor. An engine operation of the ADV is controlled based on the transformed throttle command signal at the vehicle control system, such that the ADV accelerates in a manner similar to the second type vehicle.

According to another embodiment, an input throttle command signal is transformed, and the transformed throttle command signal is used to control the engine operation of an electric vehicle, such that the acceleration characteristics of the electric vehicle mimic those of a conventional fossil fuel vehicle, such as gasoline-powered vehicles. In particular, a persistent input throttle command signal that starts at a first time instant is received at a vehicle control system of a first vehicle that is a first type vehicle. A transformed throttle command signal is generated based on the persistent input throttle signal and a present time at the vehicle control system. An engine operation of the first vehicle is controlled based on the transformed throttle command signal at the vehicle control system. An engine power output of the first vehicle would be associated with a first acceleration performance curve that is associated with the first type vehicle if the persistent input throttle command were to be used directly to control the engine operation. Controlling the engine operation of the first vehicle based on the transformed throttle command signal causes the engine power output of the first vehicle to be associated with a second acceleration performance curve that is associated with a second type vehicle.

In one embodiment, the first type vehicle is an electric vehicle, and the second type vehicle is a fossil fuel vehicle. In on embodiment, the transformed throttle command signal comprises a zero throttle command when the present time falls within a first time period after the first time instant. The transformed throttle command signal causes an increase rate of the engine power output of the first vehicle to mimic an increase rate of an engine power output associated with the second acceleration performance curve when the present time falls within a second time period after the first time period. Further, the transformed throttle command signal comprises the unchanged persistent input throttle command signal when the present time falls within a third time period immediately after the second time period. In one embodiment, an engine power output on the second acceleration performance curve starts to appear at a later time and increases at a slower rate than on the first acceleration performance curve.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
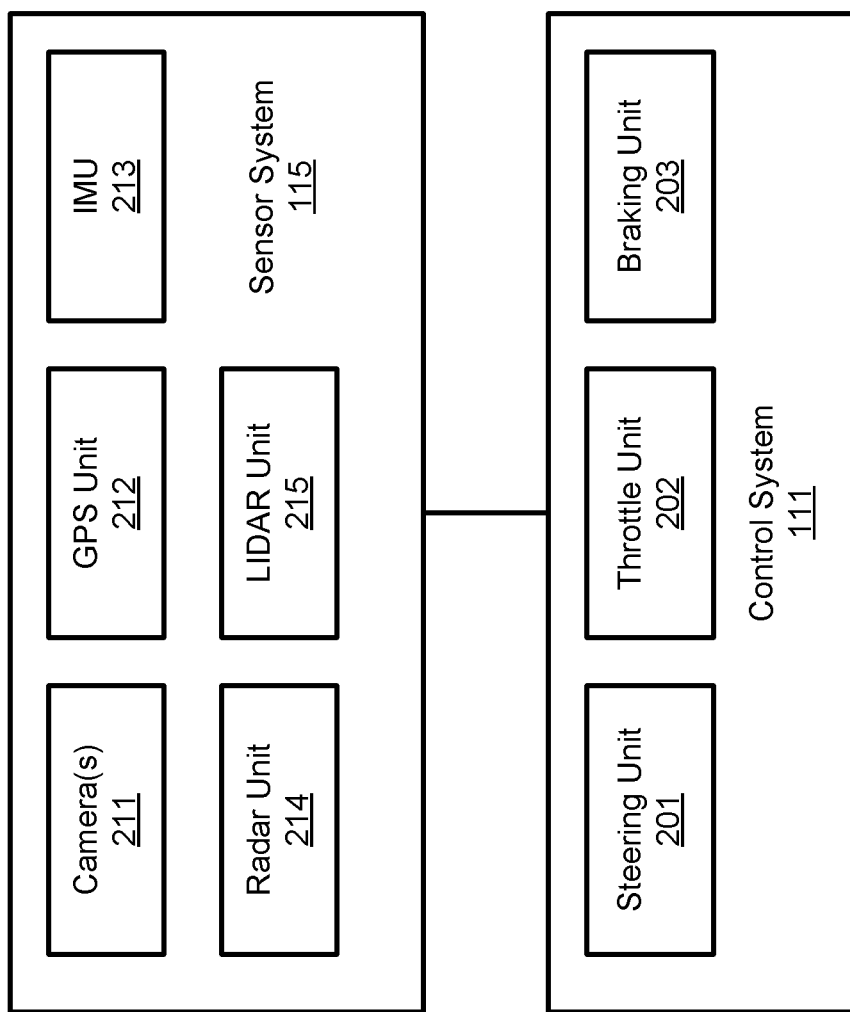
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include a set of acceleration performance curves associated with different types of vehicles, including an acceleration performance curve for an electric vehicle and an acceleration performance curve for a gasoline vehicle for each type. The acceleration performance curves may be generated based on the acceleration behaviors of the vehicles captured over a period of time. Algorithms 124 can then be uploaded on ADVs to be utilized during autonomous driving in real-time, for example, to allow an electric vehicle to mimic an acceleration behavior of a gasoline vehicle.

Figure 3A:
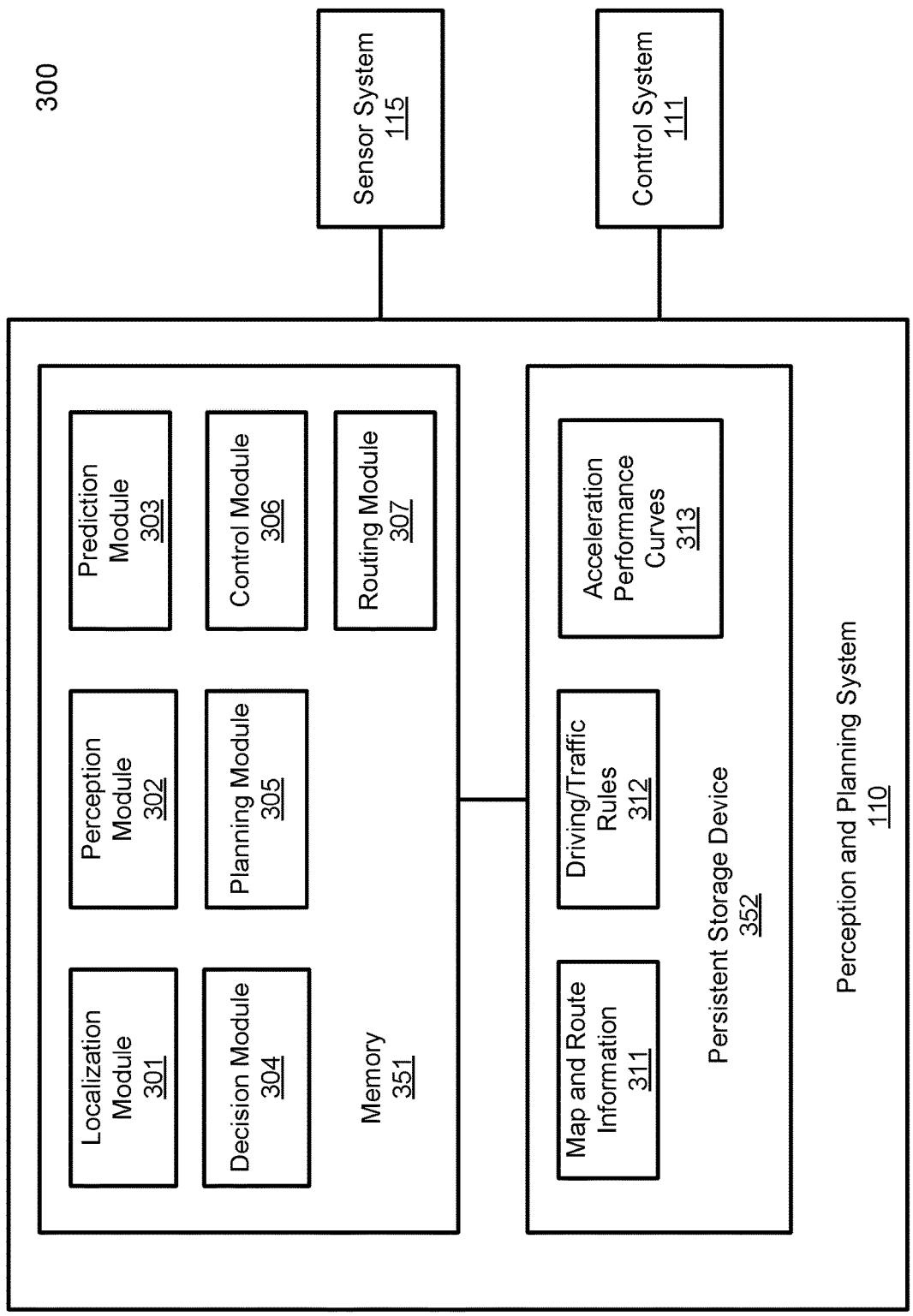
FIGS. 3A-3B are block diagrams illustrating an example of a perception and planning system used with an autonomous vehicle according to one embodiment.
Figure 3B:
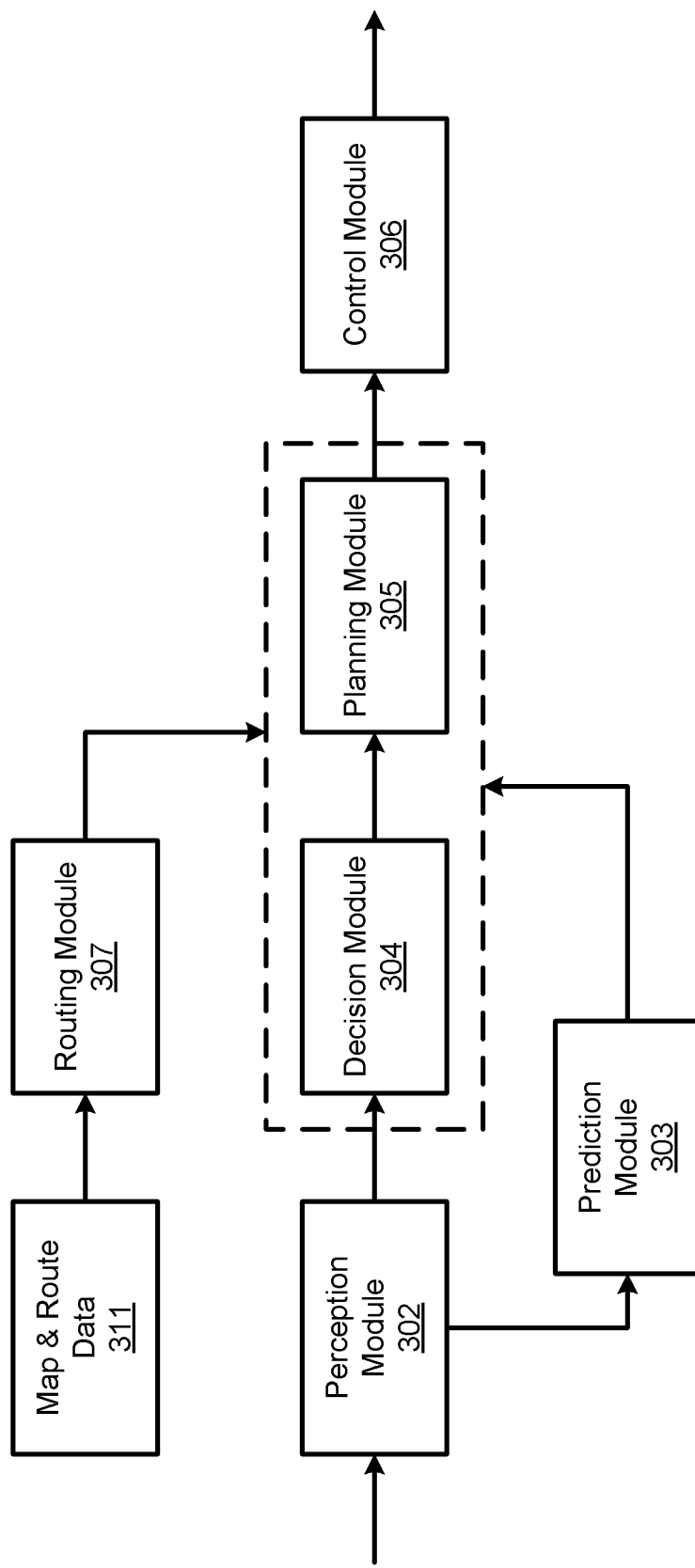

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

To enable embodiments of the disclosure, acceleration performance curves (e.g., power transient response curves) for electric vehicles as well as fossil fuel vehicles are generated, for example, based on prior driving statistics data of a large amount of vehicles. The acceleration performance curves may be utilized to transform or modify a throttle command of an electric vehicle to mimic the acceleration performance of a gasoline vehicle. An acceleration performance curve represents a power transient response of a vehicle in response to a throttle command. A power transient response refers to a changing rate of a power delivered by a vehicle in response to a throttle command issued to the vehicle.

According to one embodiment, based on the timing of issuing a throttle command issued to a first type vehicle and in view of the acceleration performance curves of the first type vehicle and a second type vehicle, the timing and/or amplitude/throttle percentage of the throttle command may be modified, for example, by control module 306, such that the vehicle of the first type (e.g., electric vehicle) can mimic the acceleration behavior of the second type (e.g., gasoline vehicle).

Figure 4A:
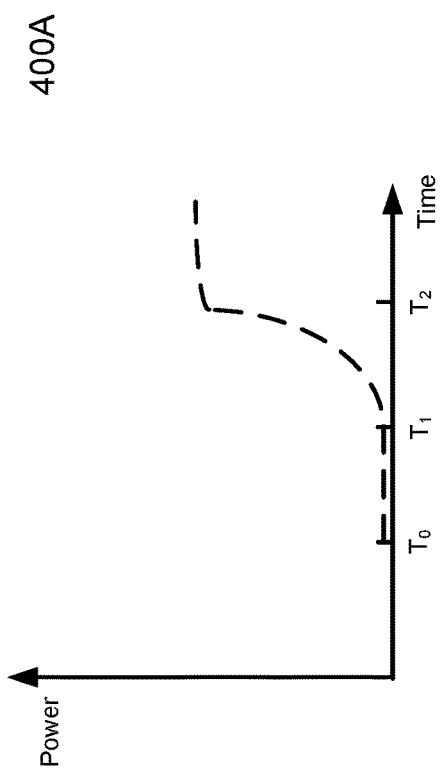
FIGS. 4A-4B are diagrams illustrating example acceleration performance curves according to one embodiment.
Figure 4B:
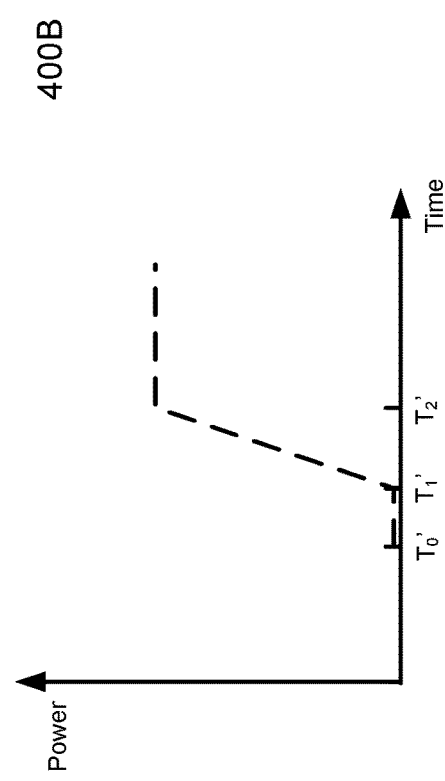

Referring to FIGS. 4A and 4B, diagrams illustrating example acceleration performance curves 400A, 400B according to one embodiment are shown. The acceleration performance curve 400A is associated with a fossil fuel vehicle, and may correspond to the second acceleration performance curve hereinafter. The acceleration performance curve 400B is associated with an electric vehicle, and may correspond to the first acceleration performance curve hereinafter. At the time instant $T_0$ (i.e., the first time instant or moment), a persistent throttle command signal starts. This may correspond to, for example, the time instant the accelerator pedal is pressed. At time instants $T_1$ and $T_1'$, the respective vehicles start to respond to the throttle command signals as the engine power outputs start to appear.

Given the same time instant $T_0$, the time instant $T_1'$ is earlier than the time instant $T_1$. This is consistent with the fact that an electric vehicle responds sooner to a throttle command signal than a fossil fuel vehicle. Typically, $T_1'$ is on the order of tens of milliseconds (ms), and $T_1$ is on the order of hundreds of milliseconds. At time instants $T_2$ and $T_2'$, the respective vehicles reach their maximum engine power outputs corresponding to the throttle command signals given. The time instant $T_2'$ is earlier than the time instant $T_2$. Further, the period between time instants $T_1'$ and $T_2'$ is shorter than the period between time instants $T_1$ and $T_2$. This is consistent with the fact that in an electric vehicle, the engine power output increases at a faster rate than in a fossil fuel vehicle. Based on the timing difference between two acceleration performance curves, a timing factor may be determined, which may be utilized to modify the initial control command to a proper control command that causes the vehicle to have an acceleration behavior similar to another type of vehicles. The timing factor refers to a relative location of a particular time moment on an acceleration performance curve.

In one embodiment, when the present time ($T_x$) falls within a first time period (i.e., $T_x < T_0 + T_1 - T_1'$) immediately after the first time instant $T_0$, the transformed throttle command signal comprises a zero throttle command. In other words, the throttle command signal is delayed by a period equal to $T_1 - T_1'$. Next, when the present time falls within a second time period (i.e., $T_0 + T_1 - T_1' < T_x < T_0 + T_2 - T_2'$) immediately after the first time period, the transformed throttle command signal causes an increase rate of the engine power output of the first vehicle to mimic an increase rate of an engine power output associated with the second acceleration performance curve. For example, this can be achieved by modifying the magnitude of the throttle command signal (CMD) as follows: $CMD_{transformed} = CMD*(T_x - (T_0 + T_1 - T_1'))/((T_2 - T_2') - (T_1 - T_1'))$. Further, when the present time falls within a third time period (i.e., $T_x > T_0 + T_2 - T_2'$) immediately after the second time period, the transformed throttle command signal comprises the unchanged persistent input throttle command signal.

Although curves and calculations based on the engine power output are described in detail here, it should be appreciated that it is within the skills of a person of ordinary skill in the art to adapt the embodiments described herein to utilize the engine torque output instead of the engine power output in the implementations.

It should be appreciated that embodiments of the disclosure can only be utilized to cause a higher performance vehicle (i.e., an electric vehicle) to mimic acceleration characteristics of a lower performance vehicle (i.e., a fossil fuel vehicle), and cannot be utilized to cause a lower performance vehicle to mimic acceleration characteristics of a higher performance vehicle.

FIG. 5 is a block diagram illustrating an example of a control module according to one embodiment. Referring to FIG. 5, control module 306 includes an input command receiving module 510, a throttle command signal transformation module 520, and an engine operation controlling module 530. The input command receiving module 510 receives a persistent input throttle command signal that starts at a first time instant at a vehicle control system of a first vehicle that is a first type vehicle. The throttle command signal transformation module 520 generates a transformed throttle command signal based on the persistent input throttle signal and a present time at the vehicle control system. The engine operation controlling module 530 controls an engine operation of the first vehicle based on the transformed throttle command signal at the vehicle control system. An engine power output of the first vehicle would be associated with a first acceleration performance curve that is associated with the first type vehicle if the persistent input throttle command were to be used directly to control the engine operation. Controlling the engine operation of the first vehicle based on the transformed throttle command signal causes the engine power output of the first vehicle to be associated with a second acceleration performance curve that is associated with a second type vehicle.

Figure 6:
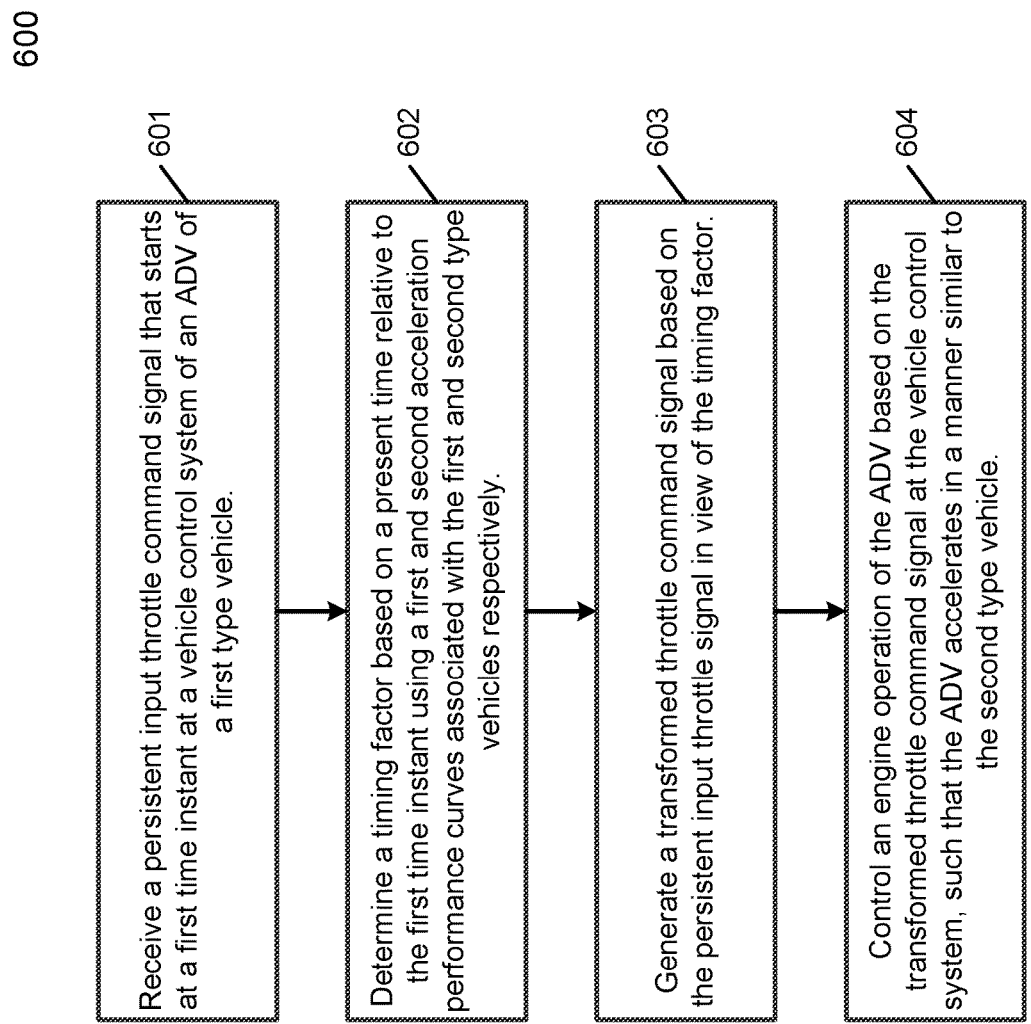
FIG. 6 is a flowchart illustrating an example method for modifying acceleration characteristics of an electric vehicle according to one embodiment.

FIG. 6 is a flow diagram illustrating a process of controlling a vehicle using an acceleration performance curve according to one embodiment. Process 600 may be performed by processing logic which may include software, hardware, or a combination thereof. For example, process 600 may be performed by control module 306. Referring to FIG. 6, at block 601, processing logic receives a persistent input throttle command signal that starts at a first time instant or moment at a vehicle control system of an ADV of a first type vehicle. At block 602, processing logic determines a timing factor based on the present time relative to the first time instant using a first acceleration performance curve of the first type vehicle and a second acceleration performance curve of a second type vehicle respectively. At block 603, processing logic generates a transformed throttle command signal based on the persistent input throttle signal in view of the timing factor (e.g., modifying magnitude and/or timing of the input throttle command). At block 604, processing logic controls the ADV based on the transformed throttle command signal, such that the ADV accelerates in a manner similar to the second type vehicle.

Figure 7:
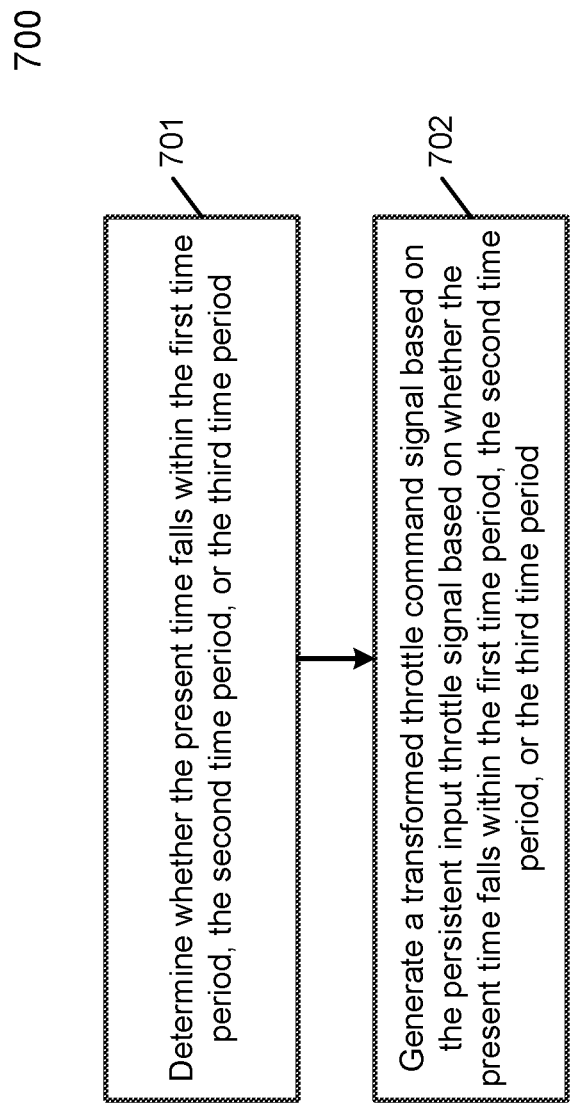
FIG. 7 is a flow diagram illustrating a process of generating a transformed throttle command signal according to one embodiment.

FIG. 7 is a flow diagram illustrating a process of generating a transformed throttle command signal. Process 700 may be performed by processing logic which may include software, hardware, or a combination thereof. For example, process 700 may be performed by control module 306. Referring to FIG. 7, at block 701, processing logic determines whether the present time falls within the first time period, the second time period, or the third time period. In particular, when $T_0 < T_x < T_0 + T_1 - T_1'$, the present time ($T_x$) falls within the first time period. When $T_0 + T_1 - T_1' < T_x < T_0 + T_2$, the present time ($T_x$) falls within the second time period. Further, when $T_x > T_0 + T_2 - T_2'$, the present time ($T_x$) falls within the third time period. At block 702, processing logic generates a transformed throttle command signal based on the persistent input throttle signal based on whether the present time falls within the first time period, the second time period, or the third time period. In particular, when the present time ($T_x$) falls within the first time period, the transformed throttle command signal comprises a zero throttle command. When the present time ($T_x$) falls within the second time period, the transformed throttle command signal causes an increase rate of the engine power output of the first vehicle to mimic an increase rate of an engine power output associated with the second acceleration performance curve. For example, this can be achieved by modifying the magnitude of the throttle command signal (CMD) as follows: $CMD_{transformed} = CMD*(T_x - (T_0 + T_1 - T_1'))/((T_2 - T_2') - (T_1 - T_1'))$. Further, when the present time ($T_x$) falls within the third time period, the transformed throttle command signal comprises the unchanged persistent input throttle command signal.

Therefore, embodiments of the disclosure enable an electric vehicle to mimic the acceleration characteristics of a fossil fuel vehicle. As a result, driver and passenger discomfort caused by the native acceleration characteristics of an electric vehicle can be avoided.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
receiving a persistent input throttle command signal that starts at a first time instant $T_0$ at a vehicle control system of the ADV that is a first type vehicle;
generating a transformed throttle command signal for the first type vehicle from the persistent input throttle command signal based on a first acceleration performance curve representing a power transient response of the first type vehicle to a first throttle command and a second acceleration performance curve representing a power transient response of a second type vehicle to a second throttle command, wherein the first acceleration performance curve includes a start time equal to $T_0$ when the first throttle command is given, a first response time $T_1$ when the first type vehicle starts to respond to the first throttle command, and a first max acceleration time $T_2$ when the first type vehicle reaches a first maximum acceleration power corresponding to the first throttle command, wherein the second acceleration performance curve includes the start time when the second throttle command is given, a second response time $T_1'$ when the second type vehicle starts to respond to the second throttle command, and a second max acceleration time $T_2'$ when the second type vehicle reaches a second maximum acceleration power corresponding to the second throttle command, wherein the transformed throttle command signal comprises a zero throttle command within a first time period equal to $T_1-T_1'$ after the first time instant $T_0$ and causes an increase rate of an engine power output of the first type vehicle to mimic an increase rate of an engine power output associated with the second acceleration performance curve within a second time period after the first time period, wherein the second time period is equal to a time period lasting from $T_0+T_1-T_1'$ to $T_0+T_2-T_2'$; and
controlling an engine operation of the ADV based on the transformed throttle command signal at the vehicle control system, such that the ADV accelerates in a manner similar to the second type vehicle.

2. The method of claim 1, wherein the first type vehicle is an electric vehicle, and the second type vehicle is a fossil fuel vehicle.

3. The method of claim 1, wherein the transformed throttle command signal comprises a corresponding portion of the persistent input throttle command signal within a third time period after the second time period.

4. The method of claim 1, wherein an engine power output on the second acceleration performance curve starts to appear at a later time and increases at a slower rate than on the first acceleration performance curve.

5. The method of claim 1, wherein controlling the engine operation of the ADV on the transformed throttle command signal causes an engine power output of the ADV according to timing of the second acceleration performance curve associated with the second type vehicle.

6. A non-transitory machine-readable medium having instructions stored therein, which when executed by a processor of an autonomous driving vehicle (ADV), cause the processor to perform operations of operating the ADV, the operations comprising:

receiving a persistent input throttle command signal that starts at a first time instant $T_0$ at a vehicle control system of the ADV that is a first type vehicle;

generating a transformed throttle command signal for the first type vehicle from the persistent input throttle command signal based on a first acceleration performance curve representing a power transient response of the first type vehicle to a first throttle command and a second acceleration performance curve representing a power transient response of a second type vehicle to a second throttle command, wherein the first acceleration performance curve includes a start time equal to $T_0$ when the first throttle command is given, a first response time $T_1$ when the first type vehicle starts to respond to the first throttle command, and a first max acceleration time $T_2$ when the first type vehicle reaches a first maximum acceleration power corresponding to the first throttle command, wherein the second acceleration performance curve includes the start time when the second throttle command is given, a second response time $T_1'$ when the second type vehicle starts to respond to the second throttle command, and a second max acceleration time $T_2'$ when the second type vehicle reaches a second maximum acceleration power corresponding to the second throttle command, wherein the transformed throttle command signal comprises a zero throttle command within a first time period equal to $T_1-T_1'$ after the first time $T_0$ and causes an increase rate of an engine power output of the first type vehicle to mimic an increase rate of an engine power output associated with the second acceleration performance curve within a second time period after the first time period, wherein the second time period is equal to a time period lasting from $T_0+T_1-T_1'$ to $T_0+T_2-T_2'$; and controlling an engine operation of the ADV based on the transformed throttle command signal at the vehicle control system, such that the ADV accelerates in a manner similar to the second type vehicle.

7. The machine-readable medium of claim 6, wherein the first type vehicle is an electric vehicle, and the second type vehicle is a fossil fuel vehicle.

8. The machine-readable medium of claim 6, wherein the transformed throttle command signal comprises a corresponding portion of the persistent input throttle command signal within a third time period after the second time period.

9. The machine-readable medium of claim 6, wherein an engine power output on the second acceleration performance curve starts to appear at a later time and increases at a slower rate than on the first acceleration performance curve.

10. The machine-readable medium of claim 6, wherein controlling the engine operation of the ADV based on the transformed throttle command signal causes an engine power output of the ADV according to timing of the second acceleration performance curve associated with the second type vehicle.

11. A data processing system, comprising:
a processor; and
a memory coupled to the processor to store instructions, which when executed by the processor, cause the processor to perform operations of operating an autonomous driving vehicle (ADV), the operations including:
receiving a persistent input throttle command signal that starts at a first time instant $T_0$ at a vehicle control system of the ADV that is a first type vehicle,
generating a transformed throttle command signal for the first type vehicle from the persistent input throttle command signal based on a first acceleration performance curve representing a power transient response of the first type vehicle to a first throttle command and a second acceleration performance curve representing a power transient response of a second type vehicle to a second throttle command, wherein the first acceleration performance curve includes a start time equal to $T_0$ when the first throttle command is given, a first response time $T_1$ when the first type vehicle starts to respond to the first throttle command, and a first max acceleration time $T_2$ when the first type vehicle reaches a first maximum acceleration power corresponding to the first throttle command, wherein the second acceleration performance curve includes the start time when the second throttle command is given, a second response time $T_1'$ when the second type starts to respond to the second throttle command, and a second max acceleration time $T_2'$ when the second type vehicle reaches a second maximum acceleration power corresponding to the second throttle command, wherein the transformed throttle command signal comprises a zero throttle command within a first time period equal to $T_1-T_1'$ after the first time instant $T_0$, and causes an increase rate of an engine power output of the first type vehicle to mimic an increase rate of an engine power output associated with the second acceleration performance curve within a second time period after the first time period, wherein the second time period is equal to a time period lasting from $T_0+T_1-T_1'$ to $T_0+T_2-T_2'$, and controlling an engine operation of the ADV based on the transformed throttle command signal at the vehicle control system, such that the ADV accelerates in a manner similar to the second type vehicle.

12. The system of claim 11, wherein the first type vehicle is an electric vehicle, and the second type vehicle is a fossil fuel vehicle.

13. The system of claim 11, wherein the transformed throttle command signal comprises a corresponding portion of the persistent input throttle command signal within a third time period after the second time period.

14. The system of claim 11, wherein an engine power output on the second acceleration performance curve starts to appear at a later time and increases at a slower rate than on the first acceleration performance curve.

15. The system of claim 11, wherein controlling the engine operation of the ADV based on the transformed throttle command signal causes an engine power output of the ADV according to timing of the second acceleration performance curve associated with the second type vehicle.

16. The method of claim 1, wherein a period between $T_1'$ and $T_2'$ is shorter than a period between time instants $T_1$ and $T_2$.

17. The method of claim 1, wherein each of the first acceleration performance curve and the second acceleration performance curve is generated based on prior driving statistics data of a plurality of vehicles.

18. The machine-readable medium of claim 6, wherein a period between $T_1'$ and $T_2'$ is shorter than a period between time instants $T_1$ and $T_2$.

19. The machine-readable medium of claim 6, wherein each of the first acceleration performance curve and the second acceleration performance curve is generated based on prior driving statistics data of a plurality of vehicles.

20. The system of claim 11, wherein a period between $T_1'$ and $T_2'$ is shorter than a period between time instants $T_1$ and $T_2$.

\* \* \* \* \*